(12) United States Patent
Durham

(10) Patent No.: US 7,703,137 B2
(45) Date of Patent: *Apr. 20, 2010

(54) CENTRALIZED DATA TRANSFORMATION

(75) Inventor: Roderick Harold Durham, Ashburn, VA (US)

(73) Assignee: Fortinet, Inc., Sunnyvale, CA (US)

( * ) Notice: Subject to any disclaimer, the term of this patent is extended or adjusted under 35 U.S.C. 154(b) by 1270 days.

This patent is subject to a terminal disclaimer.

(21) Appl. No.: 11/101,402

(22) Filed: Apr. 8, 2005

(65) Prior Publication Data

US 2006/0053265 A1    Mar. 9, 2006

Related U.S. Application Data

(60) Division of application No. 10/960,755, filed on Oct. 8, 2004, which is a continuation-in-part of application No. 10/933,504, filed on Sep. 3, 2004, and a continuation-in-part of application No. 10/933,505, filed on Sep. 3, 2004.

(51) Int. Cl.
G06F 12/16    (2006.01)
G06F 9/44    (2006.01)
(52) U.S. Cl. .......................................... 726/22; 726/23
(58) Field of Classification Search .................. 715/230; 726/1, 22–25
See application file for complete search history.

(56) References Cited

U.S. PATENT DOCUMENTS

| 6,088,804 | A | 7/2000 | Hill et al. |
|---|---|---|---|
| 6,282,546 | B1 | 8/2001 | Gleichauf et al. |
| 6,301,668 | B1 | 10/2001 | Gleichauf et al. |
| 6,389,538 | B1 * | 5/2002 | Gruse et al. ................. 713/194 |
| 6,398,245 | B1 | 6/2002 | Gruse et al. |
| 6,513,122 | B1 | 1/2003 | Magdych et al. |
| 6,546,493 | B1 | 4/2003 | Magdych et al. |
| 6,662,192 | B1 | 12/2003 | Rebane |
| 6,711,127 | B1 | 3/2004 | Gorman et al. |
| 6,766,458 | B1 | 7/2004 | Harris et al. |
| 6,907,531 | B1 | 6/2005 | Dodd et al. |
| 6,912,521 | B2 | 6/2005 | Kraft et al. |

(Continued)

OTHER PUBLICATIONS

Office Action dated Jun. 20, 2008 in related U.S. Appl. No. 10/933,505.

(Continued)

*Primary Examiner*—Kimyen Vu
*Assistant Examiner*—Edward Zee
(74) *Attorney, Agent, or Firm*—Schwegman Lundberg & Woessner, P.A

(57) ABSTRACT

A method of facilitating transformation of survey data from being in at least one foreign format used by a survey-tool to being in a desired format may include: receiving instances of foreign data from survey-tools, the foreign data being in foreign format used by the survey-tools, respectively; and appending, to the instances of foreign data, service-keys to identify the service tools which gathered the foreign data, respectively, to produce a data block that includes key-and-foreign-data pairs. Another such method may include: receiving such a data block; culling from the block key-and-foreign-data pairs; and operating upon the pairs to transform respective chunks of foreign data from being in respective foreign formats into being in corresponding desired formats according to corresponding service-keys, respectively.

8 Claims, 6 Drawing Sheets

U.S. PATENT DOCUMENTS

| | | | |
|---|---|---|---|
| 6,922,686 B2 * | 7/2005 | Okamoto et al. | 707/1 |
| 7,000,247 B2 | 2/2006 | Banzhof | |
| 7,013,395 B1 | 3/2006 | Swiler et al. | |
| 7,143,442 B2 | 11/2006 | Scarfe et al. | |
| 7,197,508 B1 | 3/2007 | Brown, III | |
| 7,278,163 B2 | 10/2007 | Banzhof et al. | |
| 7,308,712 B2 | 12/2007 | Banzhof | |
| 7,370,032 B2 * | 5/2008 | Lehnert | 707/3 |
| 7,376,834 B2 * | 5/2008 | Edwards et al. | 713/168 |
| 7,415,025 B1 * | 8/2008 | Venkataraman et al. | 370/395.2 |
| 7,424,706 B2 | 9/2008 | Ivanov et al. | |
| 7,451,488 B2 | 11/2008 | Cooper et al. | |
| 2002/0026591 A1 | 2/2002 | Harley et al. | |
| 2002/0052877 A1 | 5/2002 | Okamoto et al. | |
| 2002/0066035 A1 | 5/2002 | Dapp | |
| 2002/0104014 A1 | 8/2002 | Zobel et al. | |
| 2002/0116630 A1 | 8/2002 | Stehlin | |
| 2002/0147803 A1 | 10/2002 | Dodd et al. | |
| 2002/0188861 A1 | 12/2002 | Townsend | |
| 2003/0009694 A1 | 1/2003 | Wenocur et al. | |
| 2003/0065945 A1 | 4/2003 | Lingafelt et al. | |
| 2003/0115483 A1 | 6/2003 | Liang | |
| 2003/0126010 A1 | 7/2003 | Barns-Slavin | |
| 2003/0126472 A1 | 7/2003 | Banzhof | |
| 2003/0130983 A1 | 7/2003 | Rebane | |
| 2003/0131256 A1 | 7/2003 | Ackroyd | |
| 2003/0135749 A1 | 7/2003 | Gales et al. | |
| 2003/0154401 A1 | 8/2003 | Hartman et al. | |
| 2003/0159060 A1 | 8/2003 | Gales et al. | |
| 2003/0177121 A1 | 9/2003 | Moona et al. | |
| 2003/0204495 A1 | 10/2003 | Lehnert | |
| 2003/0204498 A1 | 10/2003 | Lehnert | |
| 2004/0025043 A1 | 2/2004 | Gallagher et al. | |
| 2004/0064722 A1 | 4/2004 | Neelay et al. | |
| 2004/0088581 A1 | 5/2004 | Brawn et al. | |
| 2004/0103192 A1 * | 5/2004 | Yli-Korhonen et al. | 709/224 |
| 2004/0111613 A1 | 6/2004 | Shen-Orr et al. | |
| 2004/0122964 A1 * | 6/2004 | Teh | 709/230 |
| 2004/0143749 A1 | 7/2004 | Tajalli et al. | |
| 2004/0221176 A1 | 11/2004 | Cole | |
| 2004/0249712 A1 | 12/2004 | Brown et al. | |
| 2005/0005159 A1 | 1/2005 | Oliphant | |
| 2005/0010819 A1 | 1/2005 | Williams et al. | |
| 2005/0010821 A1 | 1/2005 | Cooper et al. | |
| 2005/0015595 A1 * | 1/2005 | Edwards et al. | 713/168 |
| 2005/0028005 A1 | 2/2005 | Carson et al. | |
| 2005/0160480 A1 | 7/2005 | Birt et al. | |
| 2005/0229256 A2 | 10/2005 | Banzhof | |
| 2006/0004800 A1 | 1/2006 | Okamoto et al. | |
| 2006/0018478 A1 | 1/2006 | Diefenderfer et al. | |
| 2006/0018485 A1 | 1/2006 | Diefenderfer et al. | |
| 2006/0021051 A1 | 1/2006 | D'Mello et al. | |
| 2006/0021052 A1 | 1/2006 | D'Mello et al. | |
| 2006/0021053 A1 | 1/2006 | D'Mello et al. | |
| 2006/0053134 A1 | 3/2006 | Durham et al. | |
| 2006/0053475 A1 | 3/2006 | Bezilla et al. | |
| 2006/0053476 A1 | 3/2006 | Bezilla et al. | |
| 2006/0080738 A1 | 4/2006 | Bezilla | |
| 2006/0095792 A1 | 5/2006 | Hurtado et al. | |
| 2006/0129670 A1 | 6/2006 | Mayer | |
| 2006/0259779 A2 | 11/2006 | Oliphant | |
| 2006/0259972 A2 | 11/2006 | Oliphant | |
| 2007/0192867 A1 | 8/2007 | Miliefsky | |
| 2007/0256132 A2 | 11/2007 | Oliphant | |
| 2009/0119777 A1 | 5/2009 | Jeon | |
| 2009/0199298 A1 | 8/2009 | Miliefsky | |

OTHER PUBLICATIONS

Final Office Action dated Jul. 9, 2008 in corresponding U.S. Appl. No. 10/960,755.

Security Profiling Inc., White Paper, "Intrusion Detection System (IDS)," Apr. 9, 2003, http://www.securityprofiling.com/pdf/IDSPaperv1-0.pdf (37 pages total).

"CERT/CC Advisories," (2001-2004), http://www.cert.org/advisories/ (12 pages total).

"CERT® Advisory CA-2001-37 Buffer Overflow in UPnP Service on Microsoft Windows," Dec. 20, 2001, http://web.archive.org/web/20021214113234/www.cert.org/advisories/CA-2001-37.html (4 pages total).

"US-CERT—Technical Cyber Security Alerts," Jul. 13, 2005, http://www.us-cert.gov/cas/techalerts/index.html (3 pages total).

"CERT/CC Advisories," (1988-2001), http://web.archive.org/web/20011127012540:http://www.cert.org/advisories/ (41 pages total).

Office Action dated Dec. 10, 2007 in corresponding U.S. Appl. No. 10/960,755.

NETECT (Netecting Network Security)—Company Profile—5 pgs (1998).

Security Profiling Inc., White Paper—Version 4.2, SysUpdate™—Patch Management with the Policy Compliance & Enforcement (PC&E) Module, 36 pgs (Oct. 1, 2003).

NETECT (Netecting Network Security)—Company Profile—5 pgs.

Security Profiling Inc., White Paper—Version 4.2, "Sys Update™—Patch Management with the Policy Compliance & Enforcement (PC&E) Module", 36 pgs.

"U.S. Appl. No. 10/933,504, Notice of Allowance mailed Aug. 4 2009", 6 pgs.

"U.S. Appl. No. 10/933,504, Preliminary Amendment mailed Dec. 16, 2004", 13 pgs.

"U.S. Appl. No. 10/933,504, Response filed Nov. 12, 2008 to Non-Final Office Action mailed May 13, 2008", 14 pgs.

"U.S. Appl. No. 10/933,504, Non-Final Office Action mailed May 13, 2008", 14 pgs.

"U.S. Appl. No. 10/933,504, Non Final Office Action mailed Mar. 4, 2009", 18 pgs.

"U.S. Appl. No. 10/933,504, Response filed Jun. 3, 2009 to Non Final Office Action mailed Mar. 4, 2009", 13 pgs.

"U.S. Appl. No. 10/933,505, Non-Final Office Action mailed Aug. 20, 2009", 12 Pgs.

"U.S. Appl. No. 10/933,505, Response filed Nov. 20, 2008 to Non-Final Office Action mailed Jun. 20, 2008", 9 pgs.

"U.S. Appl. No. 10/933,505, Final Office Action mailed Mar. 4, 2009", 11 pgs.

"U.S. Appl. No. 10/933,505, Response filed Jun. 2, 2009 to Final Office Action mailed Mar. 4, 2009", 9 pgs.

"U.S. Appl. No. 10/960,755, Preliminary Amendment mailed Apr. 5, 2005", 6 pgs.

"U.S. Appl. No. 10/960,755, Response filed May 10, 2008 to Non-Final Office Action mailed Dec. 10, 2007", 15 pgs.

"U.S. Appl. No. 10/960,755, Response filed Jan. 21, 2009 to Non-Final Office Action mailed Jan. 5, 2009", 10 pgs.

"U.S. Appl. No. 10/960,755, Response filed Nov. 10, 2008 to Final Office Action mailed Jul. 9, 2008", 10 pgs.

"U.S. Appl. No. 10/960,755, Response filed Dec. 9, 2008 to Final Office Action mailed Jul. 9,2008", 12 pgs.

"U.S. Appl. No. 10/960,755 Non-Final Office Action mailed Jan. 5, 2009", 16 pgs.

"U.S. Appl. No. 10/960,755, Notice of Allowance mailed Apr. 15, 2009", 08 pgs.

"U.S. Appl. No. 10/994,484, Non-Final Office Action mailed Jun. 19, 2008", 7 pgs.

"U.S. Appl. No. 10/994,484, Response filed Oct. 20, 2008 to Non-Final Office Action mailed Jun. 19, 2008", 13 pgs.

"U.S. Appl. No. 10/994,484 Response filed Mar. 9, 2009 to Final Office Action mailed Dec. 8, 2008", 13 pgs.

"U.S. Appl. No. 10/994,484, Non Final Office Action mailed May 11, 2009", 10 pgs.

"U.S. Appl. No. 10/960,755, Notice of Allowance mailed Jun. 29, 2009", 9 pgs.

"U.S. Appl. No. 10/994,484 Final Office Action mailed Dec. 8, 2008", 11 pgs.

Anderson, C., "Verification and validation in industry- a qualitative survey on the state of practice", *Carina Anderson & Per Runeson -Empirical Software Enginerring,202, proceedings, 2002 International symposium*, (2002), 37-47 pgs.

Berger, D. F, "A Scalable Architecture for Public Key Distribution Acting in Concert with Secure DNS", *University of California Riverside*, (Aug. 2004), 01-149 pgs.

Moore, R. W, "Preservation Environments", *San Diego Supercomputer Center moore@udsc.edu*, (Sep. 6, 2003), 01-47 pgs.

Rahm, E., et al., "A survey of approaches to automatic schema matching", *The VLDB Journal*, The international Journal on very large database, vol. 10 issue 4, (Dec. 2001), 334-350 pgs.

Security Profiling Inc., White Paper—Version 4.2, SysUpdate™—Patch Management with the Policy Compliance & Enforcement (PC&E) Module, 36 pgs (Oct. 1, 2003).

"U.S. Appl. No. 10/933,504, Response filed Nov. 12, 2008 to Non-Final Office Action mailed May 13, 2008", 14 pgs.

"U.S. Appl. No. 10/933,505, Response filed Nov. 20, 2008 to Non-Final Office Action mailed Jun. 20, 2008", 9 pgs.

"U.S. Appl. No. 10/933,504, Non Final Office Action mailed Mar. 4, 2009", 18 pgs.

"U.S. Appl. No. 11/101,402, Non-Final Office Action mailed Feb. 27, 2009", 30 pgs.

* cited by examiner

| R_ID | POL_ID | ACT_ID | CE_ID |
|------|--------|--------|-------|
| R844 | P48765 | A20458 | CE768 |
| R844 | P48765 | A13423 | CE768 |
| R844 | P48765 | A54633 | CE768 |
| R945 | P49503 | A76464 | CE395 |
| R945 | P49503 | A98747 | CE395 |
| R844 | P09687 | A54633 | CE334 |
| R844 | P09687 | A75474 | CE334 |
| R873 | P09847 | A67321 | CE334 |
| * | * | * | * |
| * | * | * | * |
| * | * | * | * |

*Fig. 7*

| R_ID | POL_ID | CE-ID | PARAM | NEW | OLD(K-1) | OLD(K-2) |
|------|--------|-------|-------|-----|----------|----------|
| R844 | P48765 | CE768 | CPU_CNT | 1 | 2 | |
| R873 | P09847 | CE334 | DOM_NAM | ACCT | ENG | |

| CE_ID | PARAM | NEW | OLD |
|---|---|---|---|
| 160_999 | CUP_CNT | 1 | NULL |
| 160_999 | PROCESS_NAME | OUTLOOK® | NULL |
| 160_999 | DOM_NAM | ACCT | NULL |
| 160_999 | OS_TYPE | WINDOWS® 2000 | NULL |

| CE_ID | PARAM | NEW | OLD |
|---|---|---|---|
| 160_999 | CUP_CNT | 1 | 2 |
| 160_999 | DOM_NAM | ACCT | ENG |
| 160_999 | OS_TYPE | WINDOWS® 2000 | WINDOWS® XP |

CENTRALIZED DATA TRANSFORMATION

CONTINUITY AND PRIORITY

This application is a divisional of copending U.S. Patent Application having Ser. No. 10/960,755 filed Oct. 8, 2004, which is a continuation in part of copending U.S. Patent Applications (hereafter, parent applications) having Ser. Nos. 10/933,504 and 10/933,505, each of which was filed Sep. 3, 2004, the respective entireties of which are hereby incorporated by reference and for which respective priority is claimed under 35 U.S.C. §120.

BACKGROUND OF THE PRESENT INVENTION

Attacks on computer infrastructures are a serious problem, one that has grown directly in proportion to the growth of the Internet itself. Most deployed computer systems are vulnerable to attack. The field of remediation addresses such vulnerabilities and should be understood as including the taking of deliberate precautionary measures to improve the reliability, availability, and survivability of computer-based assets and/or infrastructures, particularly with regard to specific known vulnerabilities and threats.

Too often, remediation is underestimated as merely the taking of security precautions across a network. While remediation includes such taking of security precautions, it is more comprehensive. It is more accurate to view the taking of security precautions as a subset of remediation.

The taking of precautions can be based upon policies. Such policies are typically based upon security best practices, e.g., a user shall not install his own software, and/or corporate best practices, e.g., a password must be 8 characters in length. To the extent that taking of precautions is automated, the automation typically includes sampling the value of one or more parameters of a host-entity at a given point in time. Then the sampled parameter values are presented to a user to assess whether the sampled values pose a cause for concern in the context of any policies which are in place. Typically, such evaluation by the user takes place at a location remote with respect to the host-entity.

One or more survey-tools on the host-entity sample the parameters to produce survey data which will be evaluated according to the policies. Such survey data typically exhibits a variety of formats that are foreign to formats desired by the user. Accordingly, the survey-tools, or a transformation tool on the host-entity, convert the survey data from the foreign formats of the survey-tool into the desired formats before transmitting the data to the remote location of the user.

SUMMARY OF THE PRESENT INVENTION

At least one embodiment of the present invention provides a method of facilitating transformation of survey data from being in at least one foreign format used by a survey-tool to being in a desired format. Such a method may include: receiving at least first foreign data from at least a first survey-tool, the foreign data being in an at least a first foreign format used by the first survey-tool, respectively; and appending, to the at-least-first foreign data, at least a first service-key to identify the at-least-first service tool as the gatherer thereof, respectively, to produce a data block that includes at least a first key-and-foreign-data pair.

At least one other embodiment of the present invention provides a method of facilitating transformation of survey data from being in at least one foreign format used by a survey-tool to being in a desired format. Such a method may include: receiving a block of survey data, the block including at least a first chunk of foreign data formatted according to an at least first foreign format and at least a first service-key to identify an at least first service tool which gathered the at-least first chunk, respectively; culling from the block at least a first pair of a service key and a corresponding chunk of foreign data, respectively, the first pair including the first service key and the first chunk of foreign data; and operating upon the at-least-first pair to transform respective chunks of foreign data from being in respective foreign formats into being in corresponding desired formats according to corresponding service-keys, respectively.

At least one other embodiment of the present invention provides a machine-readable medium comprising instructions, execution of which by a machine facilitates transformation of survey data from being in at least one foreign format used by a survey-tool to being in a desired format, as in either of the methods mentioned above. At least one other embodiment of the present invention provides a machine configured to implement either of the methods mentioned above.

Additional features and advantages of the present invention will be more fully apparent from the following detailed description of example embodiments, the accompanying drawings and the associated claims.

BRIEF DESCRIPTION OF THE DRAWINGS

The drawings are: intended to depict example embodiments of the present invention and should not be interpreted to limit the scope thereof. In particular, relative sizes of the components of a figure may be reduced or exaggerated for clarity. In other words, the figures are not drawn to scale.

FIGS. 1, 2, 3, 4, 5, 6A, 6B and 7 are referred to in the following section entitled, "DETAILED DESCRIPTION OF EXAMPLE EMBODIMENTS (hereafter the Detailed Description Section), albeit not in numerical order. Hence, the following brief description of the drawings describes the drawings in the order in which they are first discussed in the Detailed Description Section.

FIG. 1 is a block diagram of an architecture for a policy-based remediation system into which embodiments of the present invention can be incorporated, making this system itself represent at least one embodiment of the present invention.

FIG. 2 is a version of the block diagram FIG. 1 that is simplified in some respects and more detailed in others, according to at least one embodiment of the present invention.

FIG. 3 is a UML-type sequence diagrams depicting a first part of a method of determining which policies are violated, according to at least one embodiment of the present invention. In a sequence diagram, → indicates an action that expects a response message. A ← indicates a response message. A → indicates an action for which the response is implied. And a → indicates an action for which no response is expected.

FIG. 6A is a survey table illustrating data relationships in a machine-actionable memory that represent survey data from a current sample, according to at least one embodiment of the present invention.

FIG. 6B depicts a new-vs-old table, according to at least one embodiment of the present invention.

FIG. 7 depicts a policy information table illustrating data relationships in a machine-actionable memory that represents which policies are active on which of the various host-assets, according to at least one embodiment of the present invention.

FIG. 4 depicts a violation table illustrating data relationships in a machine-actionable memory that represent policies that have been violated, according to at least one embodiment of the present invention.

FIG. 5 is a flow diagram illustrating a policy-based method of remediation selection, and a method of remediation deployment, according to at least one embodiment of the present invention.

DETAILED DESCRIPTION OF EXAMPLE EMBODIMENTS

In developing the present invention, the following problems with the Background Art were recognized and a path to a solution identified.

Where a significant amount of survey data is generated by one or more survey-tools on a host-entity, the variety of data formats is typically large. Moreover, a policy-based remediation system can enforce policies across multiple (typically many) host-entities. Consequently, for a given policy, it is a common circumstance for the foreign format of survey data gathered from a first host-entity to differ from the foreign format of the corresponding survey data gathered from a second host-entity. Thus, typically, the data transformation required at the respective host-entity represents a non-trivial computational load that grows as more and more types of survey data are gathered.

A survey-tool, or transformation tool, which can accommodate the typical non-trivial computation load is usually a piece of software that grows in complexity, size (of the code itself, as it relates to storage requirements), non-volatile memory space needed for operation, etc., as the computational load increases. An ongoing design goal is for survey-tools (and transformation tools, if present) to represent as small a burden to the host-entity as possible. This is particularly true where the host-entity is a mobile computing device such as a mobile telephone, PDA, etc.

The design goal of reducing the burden that survey-tools (and transformation tools, if present) represent to the host-entity is frustrated by the growth in the amount and types of survey data that are gathered from the host-entity. It has been recognized that reducing the transformation burden upon the host-entity can reduce the degree to which the gathering of survey data frustrates the design goal of reducing the burden which the survey-tool represents. At least one embodiment of the present invention provides an architecture for substantially reducing the aspect of data transformation as a burden upon the host-entity by shifting the aspect of data transformation away from the host-entity, or in other words, centralizing the data transformation.

Figure 1:
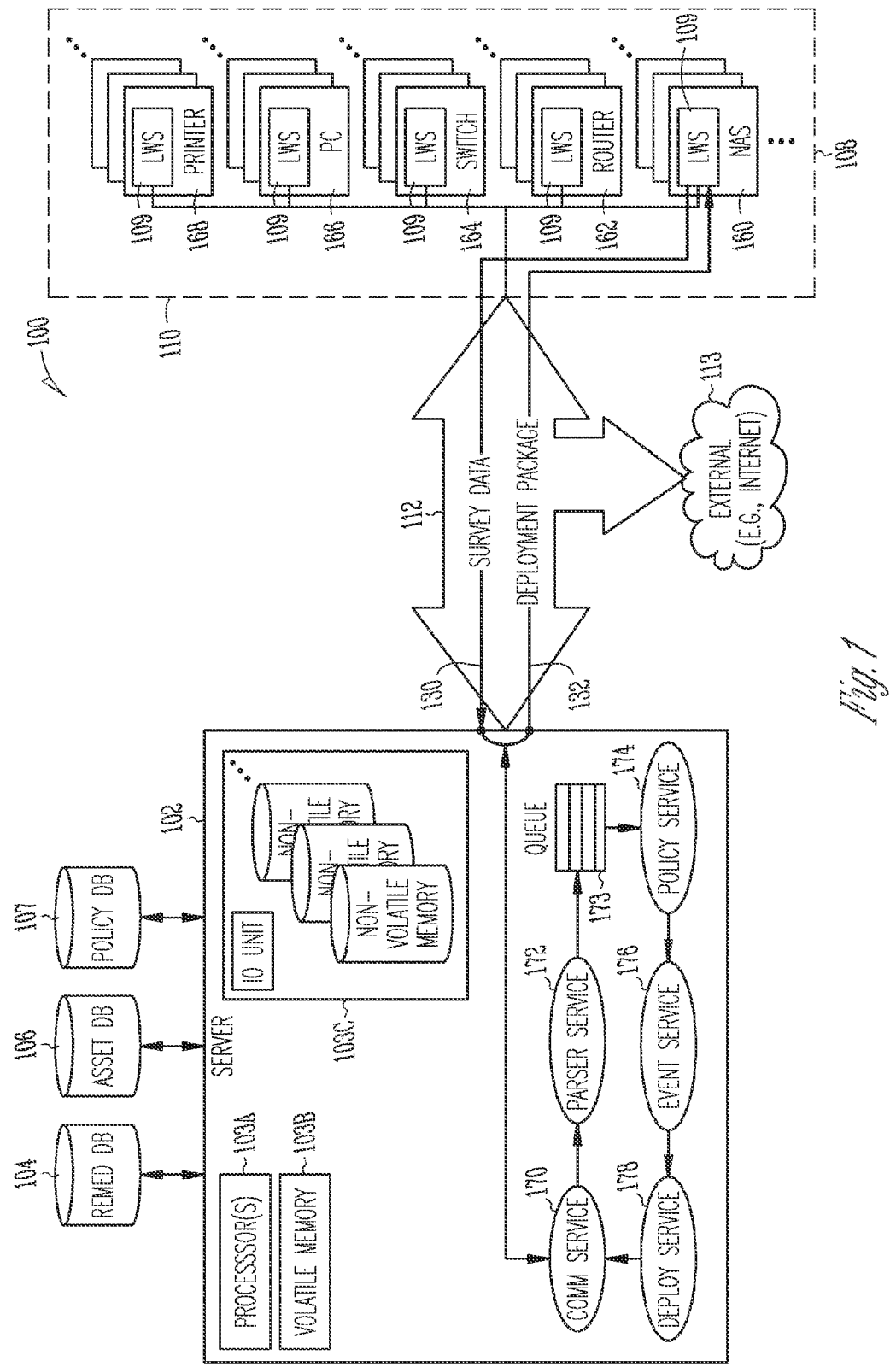

FIG. 1 is a block diagram of an architecture 100 for a policy-based remediation system into which embodiments of the present invention can be incorporated. Architecture 100 provides a helpful context in which to discuss embodiments of the present invention. The incorporation of such embodiments into architecture 100 makes architecture 100 itself represent at least one embodiment of the present invention.

Architecture 100 can include: a server 102 (having one or more processors 103, non-volatile memory 103B and other components 103C); a database (DB) of remediations 104; a DB of assets 106; a DB of policies 106; and a group 108 of networked assets. Generalized networked communication is represented by path 112. Access to entities external to architecture 100, e.g., the internet (item 113) is available via path 112.

Server 102 can be a component of the network to which group 108 represents assets. Other components 103B typically include an input/output (IO) unit, volatile memory (e.g., RAM, etc.), non-volatile memory (e.g., disk drives, etc.), etc. DBs 104, 106 and 107 can be local non-volatile memory resources of server 102.

Examples of assets in group 108 include network-attached storage (NAS) devices 160, routers 162, switches 164, computers (also referred to as PCs) 166, printers 168, mobile telephones (not depicted) with our without email capability, PDAs (not depicted) with our without email capability, etc. Assets in group 108 will be generally be referred to as host-assets 16X. In group 108, host-assets 16X can be generalized as devices having some measure of program-code-based operation, e.g., software, firmware, etc., which can be manipulated in some way via an instance of a communication, e.g., arriving via path 112, and as such can be vulnerable to attack.

Each of the various host-assets 16X in group 108 is depicted as hosting a light weight sensor (LWS) 109. Each LWS 109 and server 102 adopt a client-server relationship. Operation of each LWS 109 can include gathering information about its host-asset 16X and sending such information to server 102; and receiving remediations in an automatically-machine-actionable format from server 102 and automatically implementing the remediations upon its host-asset 16X.

An automatically-machine-actionable remediation can take the form of a sequence of one or more operations that automatically can be carried out on a given host-asset 16X under the control of its LWS 109. Such operations can be invoked by one or more machine-language commands, e.g., one or more Java byte codes.

Server 102 can evaluate the gathered-information regarding host-assets 16X in terms of policies that have been applied, or are active in regard to, host-assets 16X, respectively. Based upon the evaluations, server 102 can select remediations and then send them to host-assets 16X, respectively.

Each host-asset 16X is provided with one or more local programs and/or services (hereafter, survey-tools) that can collect values of a plurality of parameters (hereafter, survey data) which collectively characterize an operational state of host-asset 16X at a particular point in time. Each LWS 109 can invoke such survey-tools and/or cooperate with periodic scheduling of such survey-tools to obtain the survey data. Then each LWS 109 can also transmit the survey data to server 102.

For example, consider LWS 109 of NAS 160, whose transmission of survey data to server 102 is indicated by a communication path 130 superimposed on path 112 in FIG. 1. Continuing the example, once server 102 has selected one or more remediations for NAS 160, server 102 deploys the selected remediation(s) to LWS 109 of NAS 160 as indicated by a communication path 132. The selected remediations can take the form of a deployment package that can include one or more automatically-machine-actionable actions, e.g., a set of one or more Java byte codes for each automatically-machine-actionable action. It is noted that, for simplicity of illustration, only NAS 160 is depicted in FIG. 1 as sending survey data and receiving a deployment package. It is to be understood that instances of paths 130 and 132 would be present for all LWSs 109.

Next, details as to the gathering of information will be discussed. Such data can be evaluated according to policies (to be discussed in more detail below).

Figure 2:
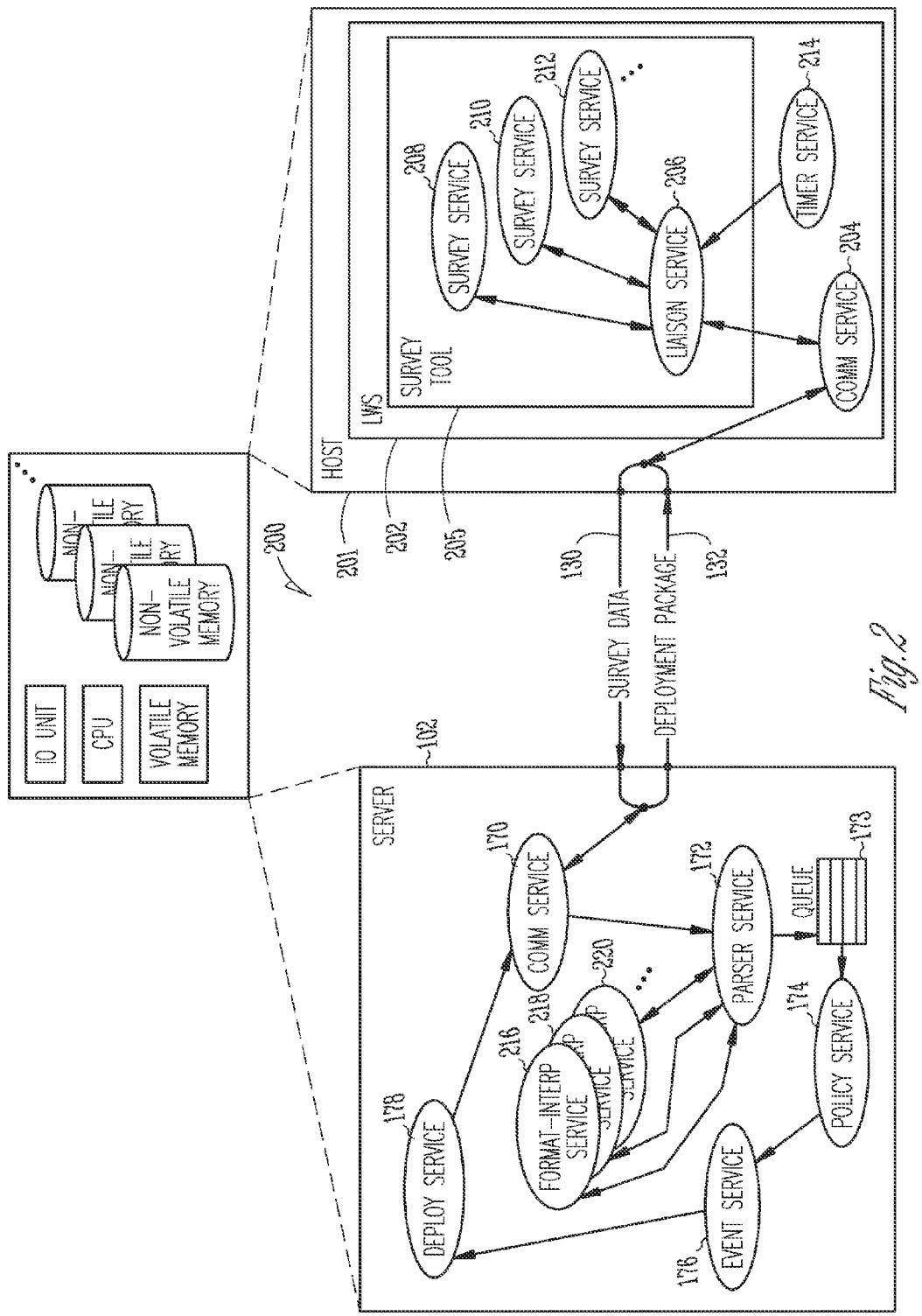

FIG. 2 is a version of the block diagram FIG. 1 that is simplified in some respects and more detailed in others. As such, FIG. 2 depicts an architecture 200, according to at least one embodiment of the present invention.

In architecture 200, only one host-asset 201 from group 108 of host-assets 16X is depicted, for simplicity. For example, host-asset 201 can correspond to NAS 160. The LWS corresponding to host-asset 201 is given item no. 202.

In FIG. 2, LWS 202 can include: a communication service 204; a timer service; and at least one survey-tool 205.

Typical hardware components for host 201 and server 102 (again) are shown in an exploded view in FIG. 2. Such components can include: a CPU/controller, an I/O unit, volatile memory such as RAM and non-volatile memory media such as disk drives and/or tape drives, ROM, flash memory, etc.

Survey-tool 205 can be a service of LWS 202. For simplicity of discussion, survey-tool 206 has been depicted as including: a liaison service 206; and survey services 208, 210, 212, etc. The number of survey services can be as few as one, or greater than the three depicted. Alternatively, survey-tool 205 can be an application program separate from LWS 202 and yet loaded on host-entity 201. Further in the alternative, where survey-tool 205 is a separate application, liaison service 206 could be a part of LWS 202 instead of a part of survey-tool 205.

Also in FIG. 2, server 102 includes: a communication service 170 (e.g., comparable, and a counterpart, to communication service 204); a parser service 172; a queue 173; a policy service 174; an event service 176; a deployment service 178; and format-interpretation (FI) services 216, 218, 220, etc. Services 170-178 and queue 173 will be discussed in more detail below. Communication services 204 and 170 can be, e.g., J2EE-type services.

FI-services 216-220 correspond and accommodate foreign data-formats used by survey services 208-210. It should be understood, however, that there is likely to be other foreign data-formats used by other survey services on other ones of host-assets 16X. Hence, there is likely to be a greater number of FI-services on server 102 than there are survey services on any one of host-assets 16X.

Survey data can be gathered, e.g., periodically, from LWS 202. Timer service 214 can control when such gathering occurs. For example, timer service 214 can monitor time elapsed since the most recent gathering/sampling of data and can trigger survey-tool 205 to re-survey when an elapsed time equals a sampling interval.

Survey data from LWS 202 (which is transferred via path 130) can be formatted in a variety of ways. For example, LWS can transfer a block of data. Within the block, chunks of data representing particular parameters can be associated with (e.g., preceded by) service-keys, respectively. For example, a service-key can be a string of data, e.g., a 32 bit integer, that denotes or is indicative of the service on host-asset 201 that gathered the chunk. Parser service 172, e.g., a J2EE-type service, can parse the data block by making use of FI-services 216-220, respectively.

Figure 3:
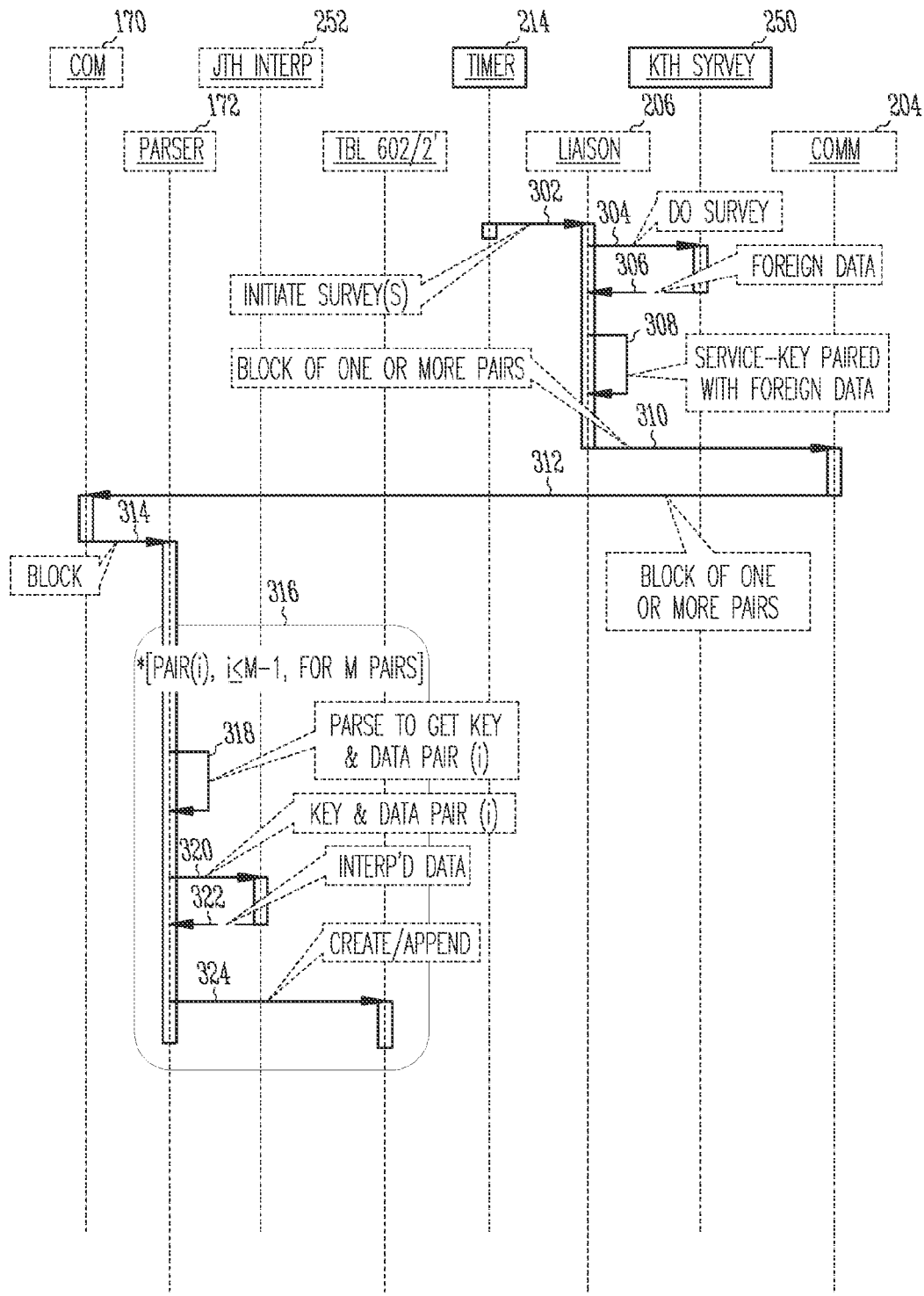

FIG. 3 is a UML-type sequence diagram depicting a method of centralizing data transformation, according to at least one embodiment of the present invention.

At message 302 in FIG. 3, timer service 214 can recognize that the sampling interval has elapsed and accordingly can command liaison service 206 to initiate one or more surveys (corresponding to the one or more survey services 208-210). At message 304, liaison service 206 can command a $k^{th}$ survey service 250, e.g., any one of survey services 208-212 to perform a survey. In response to message 304, $k^{th}$ survey service 250 can perform the survey and return the resultant data at message 306. Again, the resultant data is likely to be in a format that is foreign to a format desired by parser service 172, hence the resultant chunk of data transmitted at message 306 is hereafter referred to as foreign data. At message 308, liaison service 206 can associate the chunk of foreign data with the corresponding service-key. For example, liaison service 206 can prepend the service-key to the foreign data to form a key-and-foreign-data pair.

At message 310, liaison service 206 can send a block of survey data to communication service 204, which then can transmit the block to communication service 170 at message 312. Then at message 314, communication service 170 can forward the block to parser service 172. As two or more survey-services are typically included in survey-tool 205, messages 304-306 can be done iteratively as a loop, with one iteration for each survey service that is present. Consequently, the block transmitted at messages 310-314 typically can include multiple key-and-foreign-data pairs.

Parser service 172 can sequentially examine the data block, looking for pairs of service keys and associated data chunks. Continuing and furthering the example, parser service 172 can recognize a key-and-foreign-data pair by: searching the block until a service key (k) is encountered and recognized; recognizing as being associated therewith a foreign data chunk (k), e.g., found between service key (k) and a next service key (k+1) subsequently found in the data block; and calling a format interpretation (again, FI) service, e.g., any one of FI-services 216-220, corresponding to service key (k) to interpret foreign data chunk (k). Parser service 172 can take the output of the respective FI-services and build a survey table of new parameter values. This can be an iterative process. One of ordinary skill in the art would understand that there are other ways to process the data block.

It should be recognized that transmitting the data block from host-entity 201 to server 102, see messages 310-314, can be described as centralizing the data transformation to server 102 from host-entities 16X. In other words, the aspect of data transformation which otherwise would burden upon host-entity 201 is shifting away and placed upon server 102.

In the context of FIG. 3, such an iterative loop is denoted by item No. 316 and is given the label "*[PAIR(i), i≦M−1, FOR M PAIRS]." In UML notation, the asterisk (*) denotes iteration, and iteration of loop 324 will continue while the statement within the square brackets is true. Here, the statement for loop 316 indicates that looping iterates for each PAIR(i) of a service key and its related chunk of foreign data (or, in other words the $i^{th}$ PAIR) while (so long as) the variable, i, is less than or equal to M−1 (namely, i≦M−1). The boundary M denotes the total number of pairs of service keys and related data present in the survey data.

At self-message 318 in FIG. 3, parser service 172 can parse the data block to obtain the $i^{th}$ pair, also known as PAIR(i). At message 320, parser service 172 can call an FI-service, e.g., any one of FI-services 216-220, according to the value of the service key in PAIR(i). Hence, such an FI-service is generally referred to as a $j^{th}$ interpretation service 252, in FIG. 3. In response to message 320, $j^{th}$ interpretation service 252 can interpret the chunk of foreign data and return a version of the chunk of foreign data in a format desired by parser service 172, as indicated by message 322.

It is possible that survey tool 205 can include a survey service that has a foreign format with which parser service 172 is not familiar. In that circumstance, parser service 172 would recognize a string of data in the data block as representing a service-key albeit for an unknown service. In response, parser service 172 could simply discard the corresponding chunk of foreign data.

In response to message 322, parser service 172 can create survey table 602 if this is the first pass through loop 324 and survey table 602 does not yet exist as of the first occurrence of message 324. Otherwise, if survey table 602 already exists, then at message 322 parser service 172 can append the interpreted data to survey table 602. A fictional sample of survey table 602 is discussed later.

A discussion of format details is now provided.

The $k^{th}$ foreign format of the $k^{th}$ survey service can be described as including two aspects, a symbology and an arrangement. A common text format uses the ASCII standard as the symbology by which the foreign chunk of data is represented in symbols. There can be many varieties of arrangements used in the ASCII-text format, e.g., a delimited list (where a delimiter is a known separator between portions of data). A common non-text format uses binary numbers as the symbology by which the foreign chunk of data is represented in symbols. There can be many varieties of arrangements used in the binary-structured formats, e.g., a first value in a string of numbers can represent an integer value, a second value in the string can represent a floating point value (e.g., 32 bits in size), a third value in the string can represent a pointer to an array, etc.

Regarding different policies, corresponding survey services can return different chunks of data in different formats. For example, a survey service that gathers data from an ARP (address resolution protocol) table can generate a list of values having an ASCII text format. In contrast, a survey service that gathers data on CPU utilization can generate a single numerical value representing a percentage of utilization and having a non-text floating point format.

Regarding certain single policies, survey services on different host-entities 16X can generate chunks of data that use the same symbology but different arrangements. For example, a chunk of data representing a route table on a host-entity running the Windows® operating system (OS) can exhibit the same columns as a chunk of data representing a route table on a host-entity running the Solaris® OS, but the order of the columns will be different. The same can be said of a chunk of data representing a route table on a host-entity running the Unix® OS. Similarly, route info for the Windows® OS, Solaris® OS and Linux® can be returned in tables that include the same columns albeit arranged in different orders. In such circumstances, corresponding FI services can rearrange the columns to a desired format, where such rearrangement can be described as a type of transformation.

As another example, there can be two formats by which netmask information is represented. The two formats can use the same symbology, namely binary notation, but have different arrangements. The first format can use what is referred to as a "dotted octet" arrangement, e.g. (using decimal notation to represent each eight bit octet), 255.255.255.0. The second format can use what can be referred to as a "slash" arrangement, e.g., "IP_address/24" where the first 24 bits of an IP (internet protocol) address represent the netmask info. In such circumstances, a corresponding FI service can rearrange, e.g., the slash/24 format to the dotted octet format. Similarly, such rearrangement can be described as a type of transformation.

As yet another example, different members of the same family of operation systems can use different formats for the same parameter, where the formats differ in terms of arrangement. For example, the Windows® 2000OS for certain Intel® brand processors complies with a 32 bit architecture, while the Windows® 2000OS for certain Motorola® brand processors complies with a 64 bit architecture. Here, the arrangement of a 32 bit word versus a 64 bit word represents the difference in arrangement. In such circumstances, a corresponding FI service can convert, e.g., the 32 bit word into a 64 bit word. Or corresponding FI services can convert the arrangements into a desired third arrangement. Such conversion can be described as a type of transformation.

Discussion now returns to survey table 602.

FIG. 6A is an example of a survey table 602 illustrating data relationships in a machine-actionable memory that represent new survey data from the present sample, according to at least one embodiment of the present invention.

More particularly, survey table 602 illustrates data relationships created by parser service 172, e.g., in volatile memory 103B, based upon the survey data, according to at least one embodiment of the present invention. As such, survey table 602 illustrates a particular type of machine-actionable memory arranged according to a particular data structure.

Survey table 602 can be described as a CE_ID:PARAM: NEW:OLD mapping, where CE_ID is an acronym for an identification (ID) of a given LWS 109 loaded on a given host-asset 160X, and where each instance of a host-asset 16X can be described as a client environment (CE). Each row of table 602 can include: a CE_ID field; a PARAM field (name of parameter); a NEW field (new value of the parameter); and an OLD field (old value of the parameter). Each row of table 602 represents a mapping between a value for the CE_ID, a name or identification (ID) of a parameter, a new value thereof obtained during the present sampling (k) by the survey-tool(s), and an old value thereof obtained during a preceding sampling (e.g., k−1).

Here, continuing the example of survey data from path 130, it is assumed that NAS 160 has CE_ID=160_999 for (merely) the purposes of illustration. As will be discussed below, values of many different types of parameters are gathered from the various host-assets 160X, respectively. Further continuing the example of survey data from path 130, survey table 602 assumes that the survey data includes: the parameters CPU_CNT, PROCESS_NAME, DOM_NAM and OS_TYPE as being reported in the survey data; and the corresponding values 1, Outlook®, acct (abbreviation for account) and Windows® 2000, respectively. Initially, null values are stored in the OLD fields. Typically, many other parameters will be present in the survey data and reflected in table 602. Here, only four samples of parameters and values thereof are presented, for simplicity of illustration.

Server 102, e.g., via parser service 172, can then assess whether there has been a change in the values of the parameters in the survey data from the present sample (k) relative to a preceding sample, e.g., the immediately preceding sample (k−1). This can be done by server 102 querying asset DB 106 for all parameter records that pertain to a given host-asset 16X, and then comparing the new values (k) against the old values (e.g., k−1) to identify those that have changed. An architecture for DB 106 is discussed in the parent application.

Details regarding other interactions between services 170, 172, 174, 176 and 178 are provided in the parent application. What follows is an abbreviated discussion of those details.

Parser service 172 can perform the new-vs-old comparison iteratively, e.g., row-by-row for survey table 602 by comparing the new parameter values (k) against the old parameter values (e.g., k−1) to identify those that have changed. The result of such an iterative technique is that table 602 is converted into what can be described as a new vs. old table.

In the iterative process, parser service 172 searches through parameter values of the given host-asset 16X for an old value corresponding to the parameter of row(i) of table 602. If parser service 172 finds a corresponding old value and if the old value equals the new value, then parser service 172 deletes row(i) from table 602. Else, if parser service 172 finds a corresponding old value and if the old value does not equal the new value, then parser service 172 appends the old value to the OLD field of row(i) in table 602. If no corresponding old parameter value is found, then parser service 170 can ignore the new value.

FIG. 6B depicts such a new versus old (hereafter, new-vs-old) table 602' that illustrates a revised version of survey table 602, according to at least one embodiment of the present invention. As such, survey table 602' illustrates a particular type of machine-actionable memory arranged according to a particular data structure.

Extending the example of survey data begin in FIG. 6A, it is assumed in FIG. 6B that parser service 172 has: recognized changes in the parameters CPU_CNT, DOM_NAM, and OS_TYPE; appended the corresponding old values thereof; determined that no change has occurred in the parameter PROCESS_NAME; and deleted the row for the unchanged parameter PROCESS_NAME.

After it finishes the iterative new vs. old comparison that results in new-vs-old table 602', parser service 172 can place a copy of new-vs-old table 602' (or an object representing table 602') in queue 173, e.g., an asynchronous such as a FIFO buffer, for policy service 174 (to be discussed below). Queue 173 can absorb variations in the rate at which parser service 172 generates instances of new-vs-old table 602'.

Substantially concurrently, parser service 172 can (according to those rows, if any, remaining in table 602') also overwrite corresponding records in asset DB 106 with the new parameter values and append new records to an installment history.

The copies of the various instances of table 602' in queue 173 can be sequentially processed by policy service 174, e.g., a J2EE-type service, of server 102. Policy service 174 can obtain an instance of new-vs-old table 602' from queue 173 and then evaluate the changed data in new-vs-old table 602' against each policy that is activated for the given host-asset 16X. This can be iterative.

Before discussing the operation of policy service 174 any further, an abbreviated discussion of policies is provided. Details of policies and examples thereof are provided in the parent application.

A policy can define as a condition of a given parameter either of the following: one or more potential values of a given parameter; or one or more values based upon the given parameter. When the condition of a policy is satisfied, this is potentially indicative of unauthorized activity or manipulation of the given host-asset 16X upon which the policy has been activated.

As a first policy example, consider a policy which is violated (or, in other words, whose condition is satisfied) if the value of a CONNECTED_IP_ADDRESS parameter of a suitable database structure is not one of the IP addresses on an approved list. If such a policy is satisfied, it could potentially (though not necessarily) indicate unauthorized actively on the given host-asset 16X.

As a second policy example, consider a policy which is violated (or, in other words, whose condition is satisfied) if an authorized user of a VPN (virtual private network) is logged in during normal business hours (where VPN usage is for this user is typically expected to be after business hours) and if the given host-asset is connected to the accounting wireless domain (where the user is authorized only to access the engineering and sales domains). If such a policy is satisfied, it could potentially indicate that a known user is engaging in unauthorized activity.

As a third policy example, consider a policy which is violated (or, in other words, whose condition is satisfied) if there is a change in a CPU_CNT parameter of a suitable database structure. If such a policy is satisfied, this could be indicative of one or more processors having been stolen from or added to the given host-asset 16X. Either type of change can indicate potential unauthorized manipulation of the given-host 16X, and the latter may potentially be a precursor of forthcoming unauthorized activity on the given host-asset 16X.

Discussion now returns to policy service 174.

To evaluate the changed data in new-vs-old table 602' against each policy that is activated for the given host-asset 16X, policy service 174 can do the following: it can query policy DB 107 for all policies activated for the given host-asset 16X, e.g., by indexing according to the CE_ID value therefore; then it can build a condition-tree, e.g., in non-volatile memory 103B, for the condition of each policy that is active for a given host-asset 16X; and then it can evaluate each row of new-vs-old table 602' according to each condition-tree, which results in a violation table. An example of a violation table is depicted in FIG. 7. Details of condition trees are provided in the parent application.

FIG. 7 depicts an activated policy table illustrating data relationships in a machine-actionable memory that represents which policies are active on which of the various host-assets 16X, according to at least one embodiment of the present invention.

More particularly, FIG. 7 depicts a policy information (or, in other words, an R_ID:POL_ID:CE_ID) table 702, illustrating data relationships in a machine-actionable memory, e.g., in policy DB 107, that maps policies to remediations, and also maps policies to assets. As such, policy information table 702 illustrates a particular type of machine-actionable memory arranged according to a particular data structure.

Policy information (pol-info) table 702 includes the columns R_ID, POL_ID, ACT_ID and CE_ID. A value in the R_ID-column indicates an identification (ID) of a remediation (R_ID) suited to remediating the circumstances of a violated policy. A value in the POL_ID-column indicates an ID of a policy (POL_ID). A value in the ACT_ID-column indicates an ID of action or operation that automatically can be carried out on a given host-asset 16X to at least in-part implement a remediation. A value in the CE_D-column indicates an ID of a given host-asset 16X.

An example of constraints upon Pol-info table 702 would be as follows: each policy can map to only one remediation; a remediation, however, can map to one or more policies; each policy can map to one or more assets; etc. Pol-info table 702 can be created by the administrator of architecture 100, and edited/expanded as policies change and/or are added. Extending the example illustrated via the specific details of new-vs-old table 602' in FIG. 6B, it is assumed in FIG. 9A that records denoted by items 704 and 706 correspond to the policies violated by the data of the new-vs-old table 602'.

Again, policy service 174 can create a violation table (to be discussed in more detail below), e.g., in volatile memory 103B, to represent the additional information regarding policy(h). If the violation table has already been created in a previous iteration, then policy service 174 appends the additional information regarding policy(h) to the existing violation table.

An example of a suitable violation table can be an adaptation of new-vs-old table 602'. Information that policy service 174 can add to new-vs-old table 602' can include: an ID of the policy (POL_ID) that was violated; and an ID of a remediation (R_ID) suited to remediating the circumstances of the violated policy.

FIG. 4 depicts a violation table 402 illustrating data relationships in a machine-actionable memory that represent policies that have been violated, according to at least one embodiment of the present invention. In other words, violation table 402 illustrates a particular type of machine-actionable memory arranged according to a particular data structure.

In violation table 402, each row can identify (and thus map between) a policy that has been violated, the one or more parameters whose value (or values or changes therein) violated the policy, the new value (k) and at least the preceding corresponding value (k−1). Each row of table 402 can include: a CE_ID field (as in new-vs-old table 602'); at least one PARAM field (similar to new-vs-old table 602'); a NEW field (as in new-vs-old table 602'); at least one OLD field (similar to new-vs-old table 602'); a R_ID field; and a POL_ID field.

As noted above, policy service 174 can produce violation table 402 by adapting new-vs-old table 602', e.g., appending IDs of the violated policies (POL_IDs) and IDs of the associated remediations (R_IDs) to the corresponding rows of the parameters responsible for the violations, respectively. Extending the example illustrated via the specific details of new-vs-old table 602' in FIG. 6B, it is assumed in FIG. 4 that policies concerning the parameters CPU_CNT and DOM_NAM have been violated. Accordingly, information from the records corresponding to items 904 and 906 in R_ID: POL_ID:CE_ID table 902 has been appended to new-vs-old table 602' to form violation table 402. For simplicity of illustration, values for the column labeled OLD (K−2) have not been depicted, but such values could be present.

After completing violation table 402, policy service 174 can pass violation table 402 to event service 176, e.g., a J2EE-type service. Again, each row in violation table 402 can be described as representing a remediation for the given host-asset 16X. Server 102 can send remediations to the given LWS 109 via event service 176 and deployment service 178, e.g., as follows.

For example, event service 176 can prepare an event object corresponding to each row of violation table 402. Thus, each event object represents a remediation for the given host-asset 16X. Event service 176 can pass each event object to a deployment service 178, e.g., a J2EE-type service, which can prepare a deployment package for each event object and then send the respective deployment package to the given LWS 109 via communication service 170.

Figure 5:
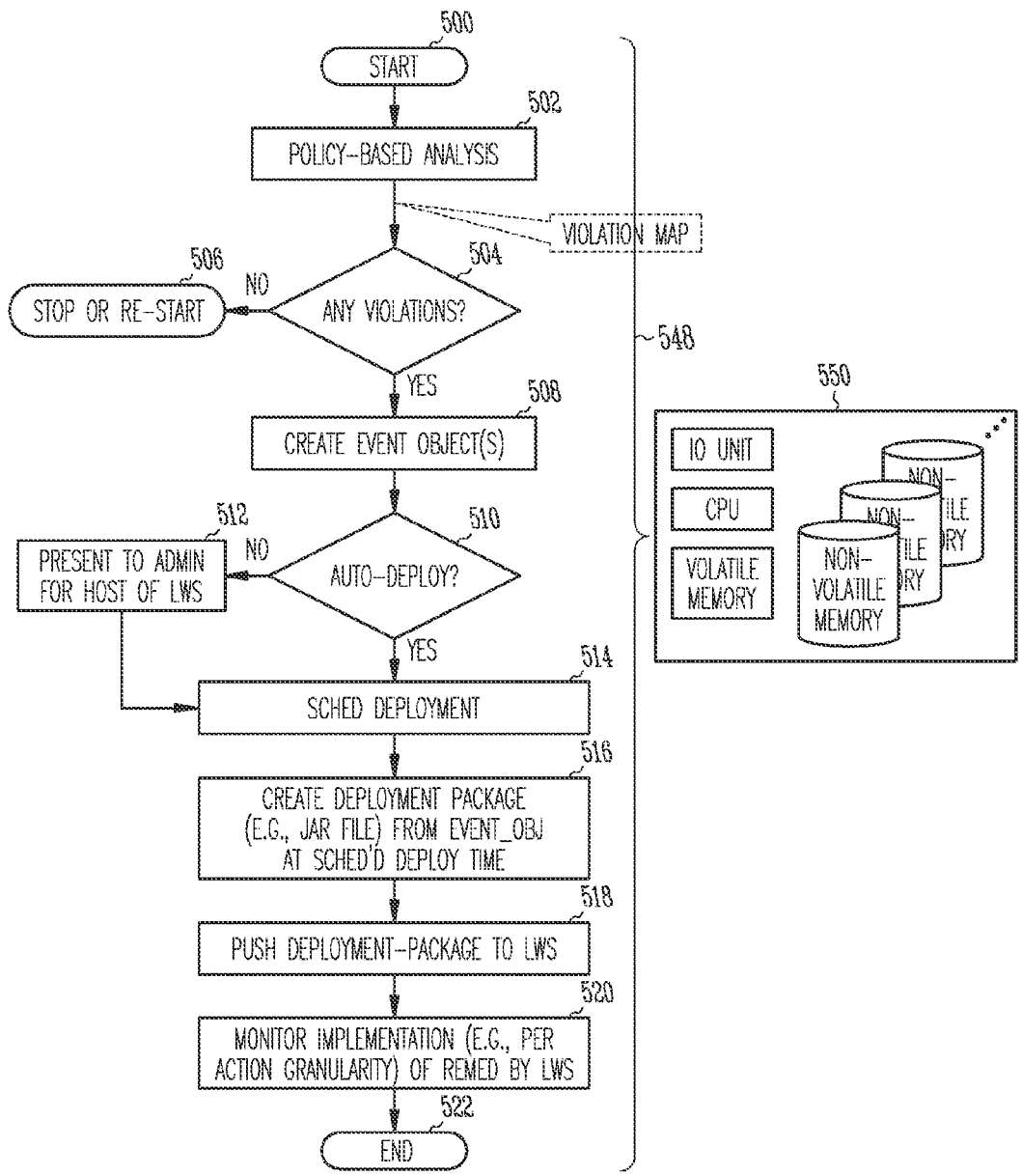

The above discussion can be summarized by referring to FIG. 5.

FIG. 5 is a flow diagram illustrating a policy-based method of remediation selection, and a method of remediation deployment, according to at least one embodiment of the present invention.

Flow in FIG. 5 begins at block 500 and proceeds to block 502, which has the label "policy-based analysis." The preceding discussion has described a policy-based analysis that yields violation map 402. This can be contrasted with what can be described as a vulnerability-based analysis.

Examples of vulnerability-based analysis are two related copending applications that are assigned to the same assignee as the present application. The two related copending applications are: U.S. patent application Ser. No. 10/897,399 having a U.S. filing date of Jul. 23, 2004; U.S. patent application Ser. No. 10/897,402 that also has a U.S. filing date of Jul. 23, 2004; and U.S. patent application Ser. No. 10/944,406 having a U.S. filing date of Sep. 20, 2004. The entirety of the '399 patent application is hereby incorporated by reference. The entirety of the '402 patent application is hereby incorporated by reference. The entirety of the '406 patent application is hereby incorporated by reference.

From block 502, flow proceeds in FIG. 5 to decision block 504, where server 102 can, e.g., via event service 176, check whether any policies activated for the given host-asset 16X have been violated. For example, this can be done by event service 176 checking if violation table has any non-null rows. If not, then flow can proceed to block 506 where flow stops or re-starts, e.g., by looping back to block 500. But if there is at least one non-null row in violation table 402, then can flow proceed to block 508, where event service 176 can create an event object (e.g., EVENT) corresponding to each non-null row in violation table 402. Flow can then proceed to decision block 510.

At decision block 510, server 102, e.g., via deployment service 178, can determine whether to automatically deploy each event object. As each is produced, event service 176 can pass the event object EVENT(i) to deployment service 178. Deployment service can then determine whether the object EVENT(i) should be automatically deployed, e.g., based upon an automatic deployment flag set in a record for the corresponding policy stored in policy DB 107. Alternatively, a field labeled AUTO_DEP can be added to violation table 402, which would be carried forward in each object EVENT (i). The administrator of architecture 100 can make the decision about whether the remediation for a policy should be automatically deployed.

If automatic-deployment is not approved for the remediation corresponding to the violated policy of object EVENT(i), then flow can proceed to block 512 from decision block 510. At block 512, deployment service can present information about object EVENT(i) to, e.g., the administrator of architecture 100, who can then decide whether or not to deploy the remediation. Flow proceeds to block 514 from block 512. But if automatic-deployment is approved for object EVENT(i), then flow can proceed directly to block 514 from decision block 510.

At block 514 of FIG. 5, at time at which to deploy object EVENT(i) is determined. Flow proceeds to block 516, where a deployment package D_PAK(i) corresponding to object EVENT(i) is prepared, e.g., as of reaching the time scheduled for deploying object EVENT(i). Deployment package D_PAK(i) can represent the remediation in an automatically-machine-actionable format, e.g., (again) a sequence of one or more operations that automatically can be carried out on the given host-asset 16X, e.g., under the control of its LWS 109. Again, such operations can be invoked by one or more machine-language commands, e.g., one or more Java byte codes. After deployment package D_PAK(i) is created at block 516, flow can proceed to block 518.

At block 518, deployment service 178 can send (or, in other words, push) deployment package D_PAK(i) to the given LWS 109. For example, deployment service 178 can pass deployment package D_PAK(i) to communication service 170. Then communication service 170 can send D_PAK(i) to the given LWS 109 over, e.g., path 132. Flow can proceed from block 518 to block 520.

At block 520 in FIG. 5, deployment service 178 can monitor the implementation upon the given host-asset 16X of the remediation represented by deployment package D_PAK(i). Such monitoring can be carried out via communication facilitated by communication service 170.

More particularly, interaction between deployment service 178 and the given LWS 109 (via communication service 170) can obtain more information than merely whether deployment package D_PAK(i) was installed successfully by the given LWS 109 upon its host-asset 16X. Recalling that a remediation represents one or more operations in an auto-matically-machine-actionable format, it is noted that a remediation will typically include two or more such operations. LWS 109 can provide deployment service 178 with feedback regarding, e.g., the success or failure of each such operation.

From block 520, flow proceeds to block 522, where the flow ends.

It is noted that a bracket 548 is depicted in FIG. 5 that groups together blocks 500-522. And bracket 548 points a block diagram of a typical computer (also referred to as a PC) 550. Typical hardware components for computer 550 include a CPU/controller, an I/O unit, volatile memory such as RAM and non-volatile memory media such disk drives and/or tape drives, ROM, flash memory, etc. Bracket 548 and computer 550 are depicted in FIG. 5 to illustrate that blocks 500-502 can be carried out by computer 550, where computer 550 can correspond, e.g., to server 102, etc.

The discussion presented above has been couched in terms of a policy-based remediation system. It should be understood that embodiments of the present invention are also well suited to network asset-management systems, as well as other systems can benefit from shifting the aspect of data transformation from being a burden upon a host-entity to being a burden upon a remote processing resource.

The methodologies discussed above can be embodied on a machine-readable medium. Such a machine-readable medium can include code segments embodied thereon that, when read by a machine, cause the machine to perform the methodologies described above.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed:

1. A method of facilitating transformation of survey data from being in a foreign format used by a survey-tool on a host-asset to being in a desired format, the method comprising:

receiving, on a server over a network from an at least first service tool on the host asset, a block of survey data, the block including at least a first chunk of foreign data formatted according to an at least first foreign format and at least a first service-key to identify the at least first service tool which gathered the at-least first chunk, respectively, the block of survey data gathered automatically by the at least first service tool on the host asset and sent to the server;

culling, by executing instructions on a processor of the server, from the block at least a first pair of a service key and a corresponding chunk of foreign data, respectively, the at least first pair including the at least first service key and the at least first chunk of foreign data;

operating upon the at-least-first pair, by executing further instructions on the processor of the server, to transform respective chunks of foreign data from being in respective foreign formats into being in corresponding desired formats according to corresponding service-keys, respectively, wherein the transforming respective chunks of foreign data from being in respective foreign formats into being in corresponding desired formats includes:

identifying at least a first format-interpretation (FI) service appropriate to the at-least-first foreign format based upon the at-least-first service-key, respectively;

passing the at-least-first chunk to the at-least-first FI-service, respectively; and receiving at least a first parcel of data formatted to the desired format from the at-least-first FI-service, respectively, the at-least-first parcel corresponding to the at-least-first chunk, respectively;

evaluating a policy active for the host asset using the at least first parcel to determine if the policy is violated;

when the policy is violated, identifying a remediation mapped to the violated policy; and sending the identified remediation to the host asset.

2. The method of claim 1, wherein:

the block of survey data includes:

at least a second chunk of foreign data formatted according to at least a second foreign format, respectively, and at least a second service-key to identify at least a second service tool which gathered the at-least-second chunk, respectively;

the culling from the block culls at least a second key-and-foreign-chunk pair; and the operating upon the at-least-first pair further operates upon the at-least-second key-and-foreign-chunk pair to transform the at-least-second chunk according to the at-least-second second key, respectively.

3. The method of claim 2, wherein the transforming includes:

identifying at least first and second format-interpretation (FI) services appropriate to the at-least-first-and-second foreign formats based upon the at-least-first-and-second service-keys, respectively;

passing the at-least-first-and-second chunks to the at-least-first-and-second FI-services, respectively; and receiving at least first and second parcels of data formatted to the desired format from the at-least-first-and-second FI-services, respectively, the at-least-first-and-second parcels corresponding to the at-least-first-and-second chunks, respectively.

4. The method of claim 1, wherein the operating upon the at-least-first pair includes:

determining if a service-key corresponds to a known foreign format; and discarding, if the service-key does not correspond to a known foreign format, the corresponding chunk.

5. A machine-readable medium including instructions stored thereon, execution of which by a processor of a machine causes the machine to perform a method that transforms survey data from being in at least one foreign format used by a survey-tool on a host asset to being in a desired format, the method comprising:

receiving, on a server over a network from an at least first service tool on the host asset, a block of survey data, the block including at least a first chunk of foreign data formatted according to an at least first foreign format and at least a first service-key to identify the at least first service tool which gathered the at-least first chunk, respectively, the block of survey data gathered automatically by the at least first service tool on the host asset and sent to the server;

culling from the block at least a first pair of a service key and a corresponding chunk of foreign data, respectively, the at least first pair including the at least first service key and the at least first chunk of foreign data;

operating upon the at-least-first pair to transform respective chunks of foreign data from being in respective foreign formats into being in corresponding desired formats according to corresponding service-keys, respectively, wherein the transforming respective chunks of foreign data from being in respective foreign formats into being in corresponding desired formats includes:

identifying at least a first format-interpretation (FI) service appropriate to the at-least-first foreign format based upon the at-least-first service-key, respectively;

passing the at-least-first chunk to the at-least-first FI-service, respectively; and receiving at least a first parcel of data formatted to the desired format from the at-least-first FI-service, respectively, the at-least-first parcel corresponding to the at-least-first chunk, respectively;

evaluating a policy active for the host asset using the at least first parcel to determine if the policy is violated;

when the policy is violated, identifying a remediation mapped to the violated policy; and sending the identified remediation to the host asset.

6. The machine-readable medium of claim 5, wherein:

the block of survey data includes:

at least a second chunk of foreign data formatted according to at least a second foreign format, respectively, and at least a second service-key to identify at least a second service tool which gathered the at-least-second chunk, respectively;

the culling further includes culling at least a second key-and-foreign-chunk pair; and the operating further includes operating upon the at-least-second key-and-foreign-chunk pair to transform the at-least-second chunk according to the at-least-second second key, respectively.

7. The machine-readable medium of claim 6, wherein the operating further causes the machine to:

identify at least first and second format-interpretation (FI) services appropriate to the at-least-first-and-second foreign formats based upon the at-least-first-and-second service-keys, respectively;

pass the at-least-first-and-second chunks to the at-least-first-and-second FI-services, respectively; and receive at least first and second parcels of data formatted to the desired format from the at-least-first-and-second FI-services, respectively, the at-least-first-and-second parcels corresponding to the at-least-first-and-second chunks, respectively.

8. The machine-readable medium of claim 5, wherein the operating further causes the machine to:

determine if a service-key corresponds to a known foreign format; and discard, if the service-key does not correspond to a known foreign format, the corresponding chunk.

\* \* \* \* \*